(12) United States Patent
Büttner et al.

(10) Patent No.: US 9,257,883 B2
(45) Date of Patent: Feb. 9, 2016

(54) ELECTRIC MACHINE WITH ROTOR INTERIOR VENTILATION

(75) Inventors: Klaus Büttner, Hollstadt (DE); Klaus Kirchner, Ostheim (DE); Michael Müller, Bad Kissingen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/131,020

(22) PCT Filed: Jun. 27, 2012

(86) PCT No.: PCT/EP2012/062417
§ 371 (c)(1),
(2), (4) Date: Apr. 10, 2014

(87) PCT Pub. No.: WO2013/004559
PCT Pub. Date: Jan. 10, 2013

(65) Prior Publication Data
US 2015/0069861 A1     Mar. 12, 2015

(30) Foreign Application Priority Data

Jul. 7, 2011   (DE) .......................... 10 2011 078 784

(51) Int. Cl.
*H02K 1/32*    (2006.01)
*H02K 9/06*    (2006.01)
*H02K 5/136*   (2006.01)
*H02K 9/14*    (2006.01)
*H02K 9/16*    (2006.01)
*H02K 15/00*   (2006.01)

(52) U.S. Cl.
CPC .. *H02K 9/06* (2013.01); *H02K 1/32* (2013.01); *H02K 5/136* (2013.01); *H02K 9/14* (2013.01); *H02K 9/16* (2013.01); *H02K 15/0006* (2013.01)

(58) Field of Classification Search
CPC .................................... H02K 1/32; H02K 9/06
IPC ................................................. H02K 1/32, 9/06
See application file for complete search history.

(56) References Cited

U.S. PATENT DOCUMENTS 3,060,335 A * 10/1962 Greenwald ..................... 310/54
3,267,868 A *  8/1966 Page ............................ 417/370

(Continued)

FOREIGN PATENT DOCUMENTS

CN      101325352 A    12/2008
DE         877035 B     5/1953

(Continued)

*Primary Examiner* — Dang Le
(74) *Attorney, Agent, or Firm* — Henry M. Feiereisen LLC

(57) ABSTRACT

An electric machine includes a stator, a rotor interacting magnetically with the stator, a housing surrounding the stator and rotor, and a hollow shaft provided for arrangement of the rotor and mounted on the housing. A radial fan is mounted rotationally fixed on the hollow shaft on the ventilation side. A section of a fan blade of the radial fan extends axially away from the housing to a greater extent than the hollow shaft. A guide element with radially extending plate is arranged in the hollow shaft, wherein the plate is arranged axially further away from the housing than the end side of the hollow shaft on the ventilation side. An inner coolant flow can thus be delivered from the section of the fan blade out of the hollow shaft through a passage between the end side of the hollow shaft on the ventilation side and the plate radially outwards.

10 Claims, 3 Drawing Sheets

(56) References Cited

U.S. PATENT DOCUMENTS

| | | | |
|---|---|---|---|
| 3,445,696 A | | 5/1969 | Erickson |
| 3,882,335 A | * | 5/1975 | Fries .......................... 310/61 |
| 4,574,210 A | * | 3/1986 | Wieland .................. 310/59 |
| 5,145,298 A | * | 9/1992 | Marantette ............... 409/135 |
| 7,489,057 B2 | | 2/2009 | Zhou et al. |
| 2011/0316380 A1 | | 12/2011 | Buettner et al. |
| 2012/0133236 A1 | | 5/2012 | Buttner et al. |
| 2012/0169158 A1 | | 7/2012 | Buttner et al. |
| 2012/0187796 A1 | | 7/2012 | Buttner et al. |
| 2012/0205996 A1 | | 8/2012 | Buttner et al. |

FOREIGN PATENT DOCUMENTS

| | | |
|---|---|---|
| JP | H0196760 U | 6/1989 |
| WO | WO 2008022108 A2 | 2/2008 |

* cited by examiner

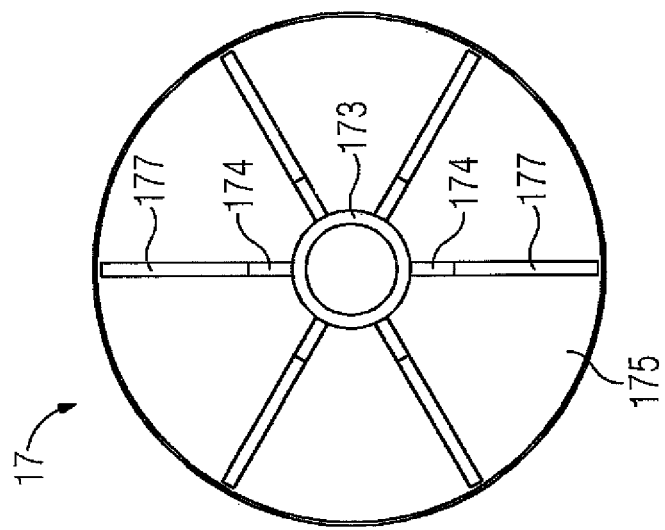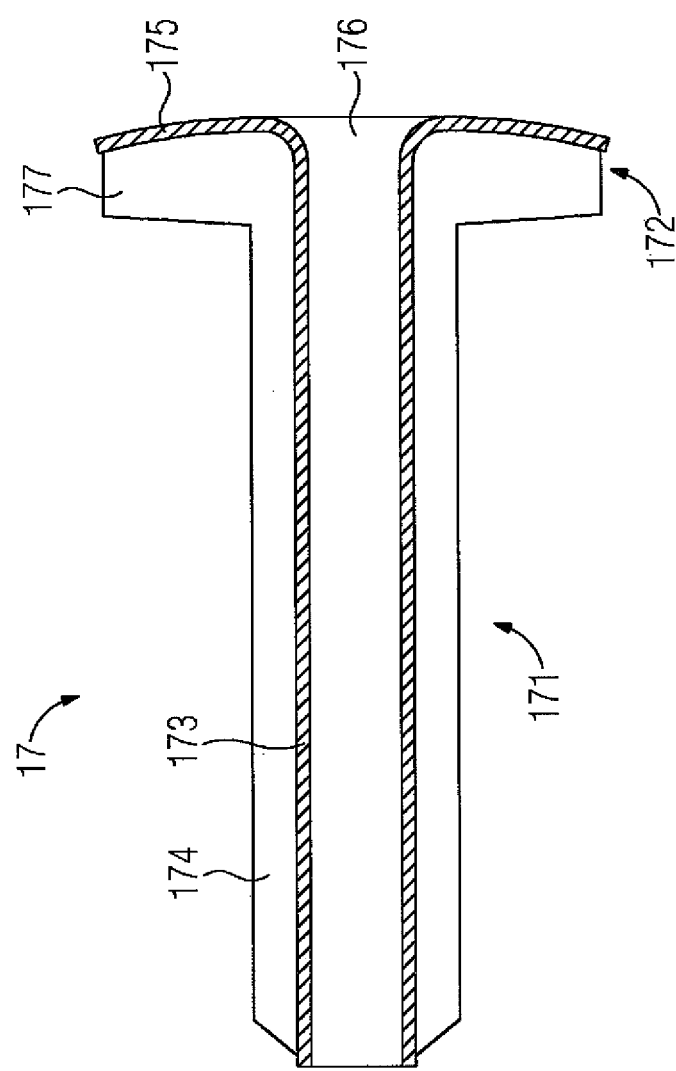

ELECTRIC MACHINE WITH ROTOR INTERIOR VENTILATION

CROSS REFERENCES TO RELATED APPLICATIONS

This application is the U.S. National Stage of International Application No. PCT/EP2012/062417, filed Jun. 27, 2012, which designated the U.S. and has been published as International Publication No. WO 2013/004559 and which claims the priority of German Patent Application, Serial No. 102011078784.4, filed Jul. 7, 2011, pursuant to 35 U.S.C. 119(a)-(d).

BACKGROUND OF THE INVENTION

The present invention relates to an electric machine having a stator, a rotor, which interacts magnetically with the stator, a housing, which surrounds the stator and the rotor, and a hollow shaft on which the rotor is arranged and which is supported on the housing.

A stator of an electric machine, which heats due to losses, can be relatively easily cooled directly by means of an air or water cooling system. The rotor of an electric machine can only be cooled directly if the motor housing is open. This requirement of an open motor housing nevertheless in some instances contravenes a special protection system of the electric machine. In particular, electric machines with explosion protection require the housing to be closed. In this case, a direct cooling of the rotor can then not be realized with previously known techniques.

The thermal energy produced due to losses in the rotor can also be output indirectly to the motor housing by transmission using air. This indirect cooling principle is however not as efficient as a direct cooling system. Furthermore, the stator is heated due to the rotor losses. A consequence of this heating-up of the electric machine is inter alia that the grease service life and thus the bearing service life is reduced.

Highly efficient cooling systems have to date been achieved for instance in open-circuit ventilated motors. On account of the open housing, only the protective system IP 23 can be retained here. With closed housings, an efficient cooling system can be achieved for instance by means of a so-called 'thermisiphon' in the rotor. This guides heat effectively outwards, without it being necessary to open the housing.

Furthermore, the publication U.S. Pat. No. 4,574,210 A describes a motor with an external rotor and a corresponding cooling system. The internal stator has a hollow shaft, through which coolant can flow. Furthermore, the coolant flows around the external rotor. A tube with a flange-type plate is placed in the hollow shaft of the stator. Cooling air then flows through the tube into the hollow shaft and back outwards between the tube and the inner wall of the hollow shaft. There the coolant is carried along by the main cooling flow, which flows past the plate to the external rotor.

A similar electric machine is described in the publication U.S. Pat. No. 3,445,696 A. There the coolant flows into the hollow shaft of a rotor, reverses inside the hollow shaft and is drawn by an injection nozzle radially outwards into the cooling flow which cools the external stator.

SUMMARY OF THE INVENTION

The object of the present invention thus consists in more effectively cooling the rotor of an electric machine.

In accordance with the invention, this object is achieved by an electric machine having
a stator
a rotor which interacts magnetically with the stator,
a housing, which surrounds the stator and the rotor and
a hollow shaft, on which the rotor is arranged and which is mounted on the housing, wherein
a radial fan is arranged in a rotationally fixed fashion on the hollow shaft on the ventilation side,
a section of a fan blade of the radial fan extends axially away from the housing to a greater extent than the hollow shaft and
a guide element with a radially extending plate is arranged in the hollow shaft, wherein
the plate is arranged axially further away from the housing than the end side of the hollow shaft on the ventilation side, so that
an inner coolant flow can thus be delivered from the section of the fan blade of the radial fan out of the hollow shaft through a passage between the end side of the hollow shaft on the ventilation side and the plate radially outwards.

A radial fan which extends axially over the hollow shaft is therefore advantageously arranged on the ventilation side. The plate thus creates a gap between it and the shaft end, through which a coolant flow, which comes out of the hollow shaft, is delivered radially outwards into the radial fan. A frequently unused region of the radial fan is thus used to guide an inner coolant flow for the rotor.

In one embodiment the hollow shaft is closed on the drive side, and coolant can enter the hollow shaft at the end side on the ventilation side. Here the hollow shaft is to reach through the entire rotor and a tube of the guide element is disposed in the hollow shaft, through which tube coolant is delivered from the ventilation side through the rotor and between the outer wall of the tube and the inner wall of the hollow shaft back to the ventilation side. This is advantageous in that no space has to be provided on the drive side for the supply of coolant. Instead, the coolant inflow takes place completely from the ventilation side. Furthermore, coolant passes completely through the rotor, even when the coolant flows into the hollow shaft on the ventilation side and flows out again on the ventilation side.

A number of axially running cooling channels can be embodied between the outer wall of the tube and the inner wall of the hollow shaft. The distribution of the coolant on the internal periphery of the hollow shaft can thus be optimized.

Furthermore, the radial fan may be embodied so as to deliver an axially arriving outer coolant flow, for cooling the housing, radially outwards. The radial fan is used here to deliver two coolant flows, namely the inner coolant flow and the outer coolant flow.

Furthermore, the guide element may comprise fan blades aligned radially with respect to the hollow shaft. These ensure that the inner coolant flow is delivered more strongly radially outwards.

It is particularly advantageous if the guide element is a part which is separate from the hollow shaft and is inserted herein from the ventilation side. A modular guide element is thus present, which can be used and/or retrofitted if necessary.

It is furthermore favorable if the guide element is manufactured from plastic. Such a plastic part can be easily produced in a complex structure as an injection molded part and has a low weight so that the inertia of the electric machine is as a result barely influenced.

It is likewise advantageous if the hollow shaft is not embodied to be hollow on a section on the drive side of the electric machine. This means that the hollow shaft on the drive side has a solid journal which is sufficiently stable to fasten a gearbox thereto for instance.

The housing around the stator and the rotor can be closed. Consequently, the cooling of the shaft of the electric machine ensures an adequate rotor cooling, without the electric machine having to be open-circuit ventilated.

In a special embodiment, the housing forms an explosion protection around the stator and the rotor. Despite efficient rotor cooling, the electric machine can thus be assigned to a high protection system.

BRIEF DESCRIPTION OF THE DRAWING

The present invention is now explained in more detail with the aid of the appended drawings, in which:

FIG. 3 shows a longitudinal section through the guide element in FIG. 2 and

FIG. 4 shows an end side view of the guide element in FIG. 2.

DETAILED DESCRIPTION OF PREFERRED EMBODIMENTS

The exemplary embodiments shown in more detail below represent preferred embodiments of the present invention.

Figure 1:
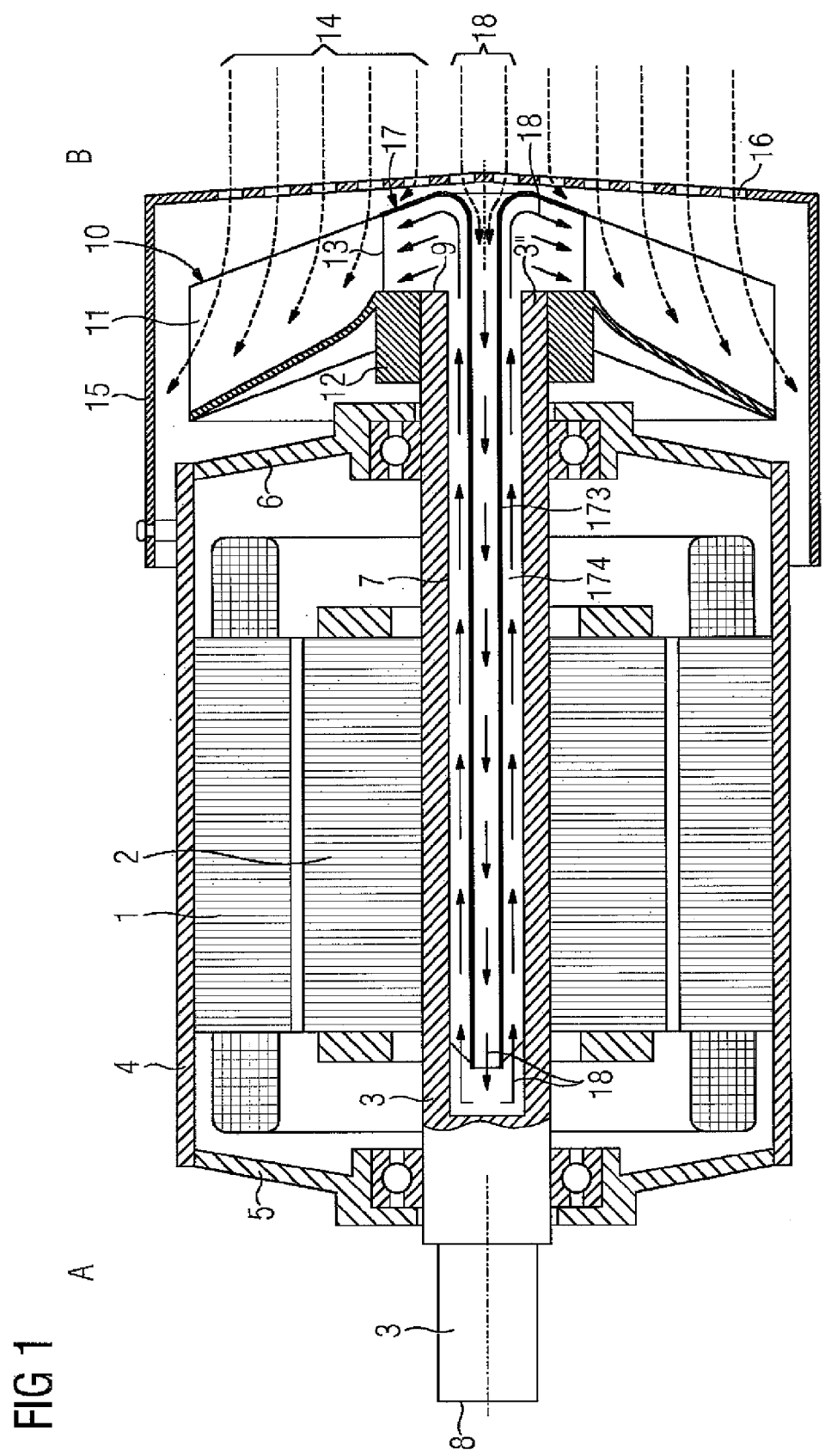
FIG. 1 shows a longitudinal section through an electric motor according to the present invention.

The example in FIG. 1 relates to an electric motor or generator having a stator 1 and a rotor 2. The rotor 2 is rotatably mounted on a hollow shaft 3 within the stator 1.

In this example, the stator 1 and the rotor 2 are accommodated in a closed housing 4. The housing 4 has a drive-side bearing shield 4 on the drive side A and a ventilation-side bearing shield 6 on the ventilation side B. The hollow shaft 3 is mounted in the bearing shields 5 and 6. The housing 4 seals the interior of the motor including the stator 1 and the rotor 2 so that explosion protection is ensured for instance.

The hollow shaft 3 protrudes here through the entire housing 4, i.e. it protrudes from the drive-side bearing shield 5 as well as from the ventilation-side bearing shield 6. Furthermore, the hollow shaft 3 has a blind hole 7, which is open on the ventilation side B, i.e. the shaft end side 9 (end side of the hollow shaft). The blind hole 7 passes through the ventilation-side bearing shield 6 and the entire rotor 2. The hollow shaft 3 is closed on the drive-side shaft end side 8, i.e. the end side of the hollow shaft 3 on the drive side A. A shaft journal 3' which is part of the hollow shaft 2 protrudes overall from the bearing shield 5 on the drive side A. The shaft journal 3' is solid and therefore has increased stability compared with the remaining part of the hollow shaft 3. In particular, it is thus suited to driving a gearbox or suchlike.

A radial fan 10 is disposed on a stub shaft 3" which is part of the hollow shaft 3 and protrudes from the ventilation-side bearing shield 6. Compared with the hollow shaft 3, it has fan blades 11 disposed radially outwards. They are fastened to a hub 12 which is mounted on the stub shaft 3".

To reduce the inertia of the electric machine, the stub shaft 3" is embodied shorter. This means that it does not protrude to the outermost axial end of the radial fan 10. Instead, the stub shaft 3" ends clearly upstream of the outermost axial end of the radial fan 10, so that a section 13 of each fan blade 11 protrudes axially past the hollow shaft 3 and/or the stub shaft 3". Radial fans embodied in such a way are customary and are used to deliver a main cooling flow 14 radially outwards. This main cooling flow 14 firstly strikes a fan hood 15, which surrounds the radial fan 10 and is fastened to the housing 4. The fan hood 15 has breakthroughs 16 on the front side, through which the main cooling flow 14 can pass to the radial fan 10. The main cooling flow 14 through the radial fan 10 retains a radial component, so that it is guided radially outwards to the casing of the fan hood 15 and/or to the casing of the housing 4.

A guide element 17 is inserted into the blind hole 7. The guide element 17 provides for an inner coolant flow 18, which is introduced into the hollow shaft 3 on the ventilation side B, routed through the rotor 2 and guided back radially outwards to the fan blades 11 on the ventilation side B.

Figure 2:
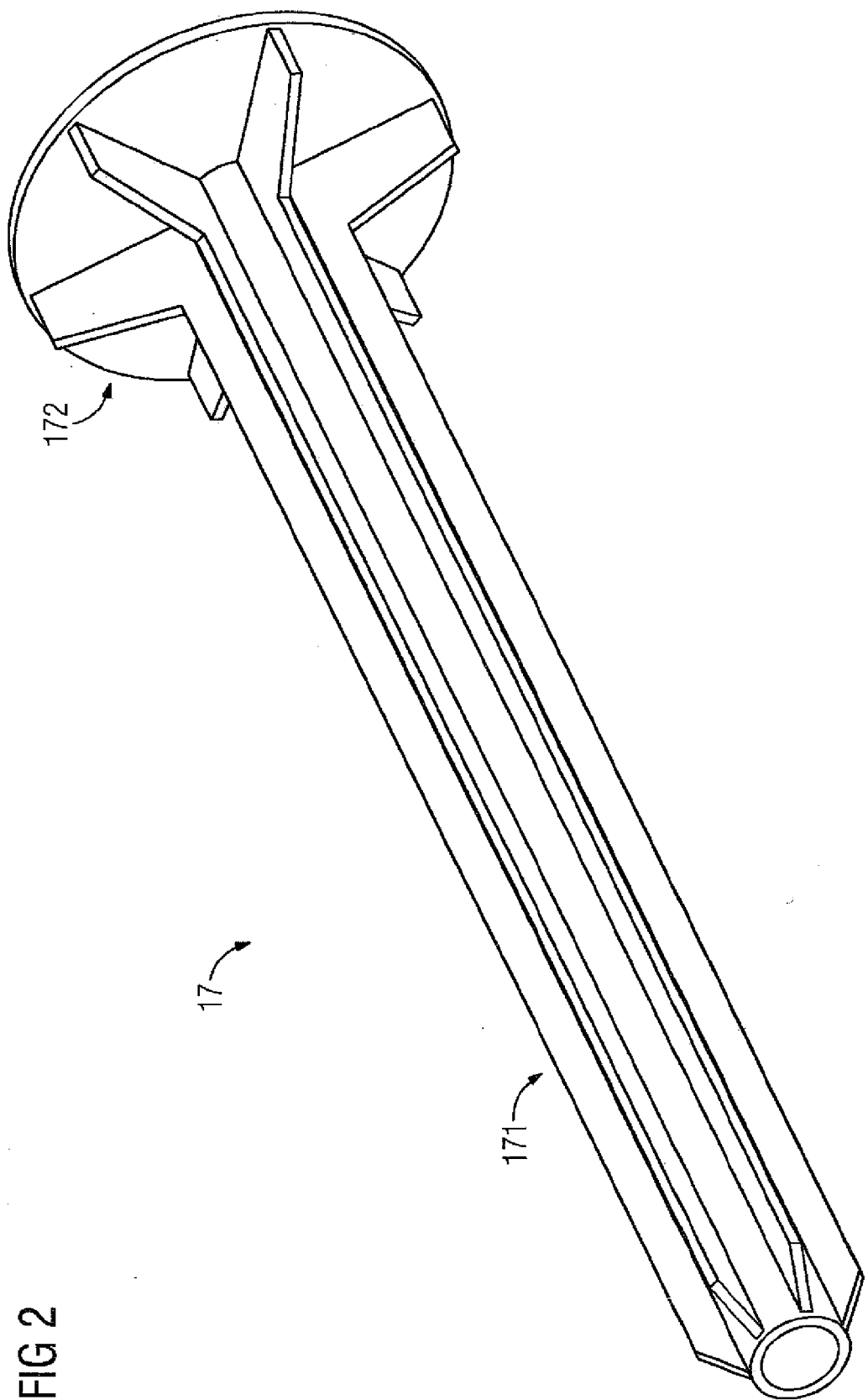
FIG. 2 shows a view of a guide element.

A guide element 17, which can be manufactured from a light plastic so as to reduce the inertia of the electric machine is shown in FIG. 2. The guide element 17 is used to guide the inner coolant flow 18 inside the blind hole 7 and when flowing out, out of the hollow shaft 3. A longitudinal section of the guide element 17 is shown in FIG. 3 and an end side view is shown in FIG. 4.

The guide element 17 has a shank 171 and a plate section 172. The shank 171 here has a completely continuous tube 173. Star-shaped ribs 174 are molded radially outwards on the tube 173 (see FIG. 3 and FIG. 4). The present example shows three such ribs 174 running in the axial direction. If the guide element 17 is inserted into the blind hole 7 of the hollow shaft 3, coolant channels form through the star-shaped ribs 174 between the inner wall of the blind hole 7 and the outer wall of the tube 173 in each case separated by the ribs 174. In the present example, three such coolant channels result, into which the inner coolant flow 18 flows back to the ventilation side B from the base of the blind hole 7.

The plate section 172 is molded on the one end of the shank 171. It has a plate 175, which essentially extends radially outwards. The plate 175 has a through-opening 176 in its center, into which the tube 173 opens. The edge of the plate 175 is aligned somewhat axially rearwards toward the shank 171. It thus follows the curve of the outer edges of the fan blade 11 (see FIG. 1).

In particular, the plate 175 joins flush with the exteriors of the protruding sections 13 of the fan blades 11.

The plate section 172 has a radially protruding fan blades 177 directly on the plate 175. These extend at the outermost radial edge in the axial direction according to the section 13 of each fan blade 11. The fan blades 177 thus rest against the shaft end face 9 and/or the front face of the hub 12, and at the same time the plate 175 is flush with the outer contour of the fan blades 11.

The guide element 17 thus represents an additional component, which can be used in a modular manner. It is used here as an additional rotor fan and is inserted into the rotor bore. The guide element 17 can in principle also be equipped without the fan blades 177.

The guide element has the following functions:
a) Coolant and/or fresh air is taken into the tube 173 from the outside on the ventilation side B.
b) The coolant and/or air is guided through the rotor 2 in the tube 173.
c) The coolant (inner coolant flow 18) flows out of the end of the tube 173 in the vicinity of the base of the blind hole 7. The inner coolant flow 18 is axially deflected at the base of the blind hole 7, so that it flows back to the ventilation side B.

d) The axial reversal of the inner coolant flow 18 takes place in one or a number of channels, which are separated in the peripheral direction by the ribs 174 of the guide element 17. The reversal takes place outside of the tube 173, so that the inner coolant flow 18 can absorb heat from the rotating shaft 3 (i.e. heat losses from the motor, mainly those of the rotor) across the inner shaft surface.

e) The guide element 17 finally has the function of expelling the coolant in the region of the radial fan 10. Here the inner coolant flow 18 of the rotor cooling is discharged into the outer main cooling flow 14 of the radial fan 10.

The function of the rotor fan (here radial fan 10) is assisted in the outflow area by the coolant flow of the main fan 10. A support of the inner coolant flow 18 according to the injector principle (venturi nozzle) namely develops in the transition region between the guide element 17 and the fan blades 11 in section 13.

The coolant flow for the rotor is here taken in from the ventilation side B and is also discharged again via the ventilation side after being heated up in the rotor.

The intake and discharge of the coolant in the above example takes place on the ventilation side B. In an alternative embodiment, the coolant can also flow via the drive-side shaft end side 8. In this case, an axial deflection of the coolant flow within the shaft is not required. The guide element 17 does not then need to have any tube 173. Optionally, it can naturally have the star-shaped protruding ribs 174, which bound the axial flow channels inside the shaft. The main object of the guide element 17 is then the deflection of the inner coolant flow 18 in the radial direction to the axially protruding sections 13 of the fan blade 11.

The afore-cited examples relate to open cooling systems. The inventive cooling principle can however also be applied to a rotor cooling in a closed system.

It is the current prior art that the shafts 3 are set back in the region of the fan seat in order to save on shaft steel material. This space is now used in accordance with the invention for the fan blades 177 of the internal rotor fan. As a result, a modular use and/or a retrofitting of the electric machine is possible with an internal rotor fan, since all components remain uninfluenced in terms of their dimensions. Provision is only made for a bore and/or blind hole in the shaft. The rotor dynamics and the natural bending frequency is only influenced to a very limited degree by the measures in the shaft.

Since the interior of the motor and/or the electric machine is not opened, the protective system remains uninfluenced by the additional rotor cooling system. The ventilation principle can thus also be applied to explosion-protected motors.

It is also advantageous, as indicated already, that the construction volume and add-on volume is not changed by retrofitting the additional rotor cooling system. In such cases only a hole is to be made and/or retrofitted in the shaft and the internal rotor fan (guide element 17) is to be inserted into the shaft. An axial fixing of the guide element 17 takes place for instance by means of a snap-on closure. The fixing is to permit disassembly of the internal rotor fan.

The degree of motor efficiency can advantageously be increased by reducing the stator and rotor temperatures using the inventive fan concept. The winding service life, and also the bearing and grease service life can also be increased in the process.

The invention claimed is:

1. An electric machine, comprising:
   a stator,
   a rotor interacting magnetically with the stator;
   a housing in surrounding relation to the stator and the rotor, said housing having a ventilation side;
   a hollow shaft configured for arrangement of the rotor and mounted on the housing, said shaft being sized to extend axially beyond the housing;
   a radial fan arranged in fixed rotative engagement on the hollow shaft on the ventilation side of the housing, said radial fan having a fan blade which has a section sized to extend axially away from the housing to a greater extent than the hollow shaft; and
   a guide element arranged in the hollow shaft and having a radially extending plate which extends axially further away from the housing than an end side of the hollow shaft on the ventilation side and is axially spaced from the end side of the hollow shaft so as to define a cooling channel for flow of a coolant from the hollow shaft radially outwards by the section of the fan blade of the radial fan through a passage between the end side of the hollow shaft on the ventilation side and the plate into said radial fan.

2. The electric machine of claim 1, wherein the hollow shaft is closed on a drive side of the housing and sized to extend through the rotor, with coolant being able to enter the hollow shaft at the end side on the ventilation side, said guide element having a tube for passage of coolant from the ventilation side through the rotor and between an outer wall of the tube and an inner wall of the hollow shaft back to the ventilation side.

3. The electric machine of claim 2, wherein the tube is configured to define a number of axial channels between the outer wall of the tube and the inner wall of the hollow shaft.

4. The electric machine of claim 1, wherein the radial fan is configured to deflect an axial outer coolant flow radially outwards for cooling the housing.

5. The electric machine of claim 1, wherein the guide element has fan blades aligned radially with respect to the hollow shaft.

6. The electric machine of claim 1, wherein the guide element is a part which is separate from the hollow shaft and is configured for insertion into the hollow shaft from the ventilation side.

7. The electric machine of claim 1, wherein the guide element is made of plastic.

8. The electric machine of claim 1, wherein the hollow shaft has a solid section on a drive side of the housing.

9. The electric machine of claim 1, wherein the housing is closed around the stator and the rotor.

10. The electric machine of claim 9, wherein the housing is configured to form an explosion protection around the stator and the rotor.

* * * * *